US008253563B2

(12) United States Patent
Burnard et al.

(10) Patent No.: US 8,253,563 B2
(45) Date of Patent: Aug. 28, 2012

(54) SYSTEM AND METHOD FOR INTRUSION DETECTION

(75) Inventors: Jonathan James Burnard, New Glarus, WI (US); Tor Sønsterød, Heggedal (NO)

(73) Assignee: iDTEQ AS, Asker (NO)

( * ) Notice: Subject to any disclaimer, the term of this patent is extended or adjusted under 35 U.S.C. 154(b) by 848 days.

(21) Appl. No.: 11/920,379

(22) PCT Filed: May 16, 2006

(86) PCT No.: PCT/IB2006/001273
§ 371 (c)(1),
(2), (4) Date: Dec. 4, 2008

(87) PCT Pub. No.: WO2006/123217
PCT Pub. Date: Nov. 23, 2006

(65) Prior Publication Data
US 2009/0212943 A1 Aug. 27, 2009

(30) Foreign Application Priority Data
May 18, 2005 (NO) .................................. 20052403

(51) Int. Cl.
*G08B 13/00* (2006.01)
(52) U.S. Cl. ........................................ 340/541; 340/565
(58) Field of Classification Search .................. 340/541, 340/545.3, 545.4, 551, 552, 561, 565
See application file for complete search history.

(56) References Cited

U.S. PATENT DOCUMENTS

| 4,062,012 A | | 12/1977 | Colbert et al. | |
|---|---|---|---|---|
| 4,290,058 A | * | 9/1981 | Bystricky | 340/566 |
| 5,578,988 A | * | 11/1996 | Hoseit et al. | 340/522 |
| 5,581,237 A | * | 12/1996 | DiPoala | 340/554 |
| 5,793,288 A | * | 8/1998 | Peterson et al. | 340/567 |
| 6,137,407 A | * | 10/2000 | Akagawa et al. | 340/552 |
| 6,677,887 B2 | * | 1/2004 | Harman | 342/28 |
| 7,917,393 B2 | * | 3/2011 | Valdes et al. | 705/50 |

FOREIGN PATENT DOCUMENTS

| CA | 2130737 | 4/1995 |
|---|---|---|
| EP | 1 449 726 A1 | 8/2004 |
| JP | 7-159238 A | 6/1995 |

* cited by examiner

*Primary Examiner* — Toan N Pham
(74) *Attorney, Agent, or Firm* — Ladas & Parry LLP

(57) ABSTRACT

Present day intrusion detection systems frequently cause false alarms by mistaking occupants as intruders, and it is desirable to reduce such false alarms. This invention comprises a processor that employs various software algorithms. The processor receives signals over temporal periods and software algorithms statistically discern various activities, thereby reducing false alarms and detection failures. The software algorithms are adaptive to the level of detected activity such that a rate of false alarms may be predetermined. As such, the processor and software algorithms comprise an artificial intelligence system. This artificial intelligence system may be employed in intruder and vehicle alarm systems composed of a multiplicity of detectors and within such detectors. A second aspect of this invention is an improved infrasound detection method that may be employed in such artificial intelligence.

24 Claims, 7 Drawing Sheets

Detector System Signal Information

| Information | Characteristic | Source | Temporal |
|---|---|---|---|
| i1 | Change of State | Detector 1 | $\Delta t$ |
| i2 | Change of State | Detector 2 | $\Delta t$ |
| i3 | Change of State | Detector 3 | $\Delta t$ |

FIG. 4

Detector System Logic Statements

| Logic Statement | | | | | |
|---|---|---|---|---|---|
| 1. | I1 | | | | |
| 2. | I1 | then | I1 | | |
| 3. | I1 | then | I2 | | |
| 4. | I1 | then | I3 | | |
| 5. | I1 | then | I1 | then | I1 |
| 6. | I1 | then | I1 | then | I2 |
| 7. | I1 | then | I2 | then | I2 |
| 8. | I1 | then | I3 | then | I3 |
| 9. | I1 | then | I3 | then | I3 |
| 10. | I1 | then | I2 | then | I3 |
| 11. | I1 | then | I3 | then | I2 |
| 12. | I2 | | | | |
| 13. | I2 | then | I1 | | |
| 14. | I2 | then | I2 | | |
| 15. | I2 | then | I3 | | |
| 19. | I2 | then | I2 | then | I2 |
| 18. | I2 | then | I2 | then | I1 |
| 17. | I2 | then | I1 | then | I1 |
| 16. | I2 | then | I2 | then | I3 |
| 25. | I2 | then | I3 | then | I3 |
| 24. | I2 | then | I1 | then | I3 |
| 22. | I2 | then | I3 | then | I1 |
| 23. | I3 | | | | |
| 21. | I3 | then | I1 | | |
| 20. | I3 | then | I2 | | |
| 29. | I3 | then | I3 | | |
| 28. | I3 | then | I3 | then | I3 |
| 27. | I3 | then | I3 | then | I1 |
| 26. | I3 | then | I1 | then | I1 |
| 30. | I3 | then | I3 | then | I2 |
| 31. | I3 | then | I2 | then | I2 |
| 32. | I3 | then | I1 | then | I2 |
| 33. | I3 | then | I2 | then | I1 |

FIG. 5

Infrasound Detection Signal Information

| Information | Characteristic | Source | Temporal |
|---|---|---|---|
| i1 | Amplitude | Signal 1 | t1 = 0 |
| i2 | Frequency | | |
| i3 | Amplitude | Signal 2 | Δt2 = t2 - t1 |
| i4 | Frequency | | |
| i5 | Amplitude | Signal 3 | Δt3 = t3 - t2 |
| i6 | Frequency | | |
| i7 | Amplitude | Signal 4 | Δt4 = t4 - t3 |
| i8 | Frequency | | |

FIG. 9

Infrasound Detection Logic Statements

| Logic Statement | | | | | | | | | |
|---|---|---|---|---|---|---|---|---|---|
| 1. | I1 | | | | | | | | |
| 2. | (I1 and I2) | | | | | | | | |
| 3. | I1 | then | I3 | | | | | | |
| 4. | I1 | then | (I3 and I4) | | | | | | |
| 5. | (I1 and I2) | then | I3 | | | | | | |
| 6. | (I1 and I2) | then | (I3 and I4) | | | | | | |
| 7. | I1 | then | I3 | then | I5 | | | | |
| 8. | I1 | then | I3 | then | (I5 and I6) | | | | |
| 9. | I1 | then | (I3 and I4) | then | I5 | | | | |
| 10. | (I1 and I2) | then | I3 | then | I5 | | | | |
| 11. | I1 | then | (I3 and I4) | then | (I5 and I6) | | | | |
| 12. | (I1 and I2) | then | (I3 and I4) | then | I5 | | | | |
| 13. | (I1 and I2) | then | I3 | then | (I5 and I6) | | | | |
| 14. | (I1 and I2) | then | (I3 and I4) | then | (I5 and I6) | | | | |
| 15. | I1 | then | I3 | then | I5 | then | I7 | | |
| 19. | (I1 and I2) | then | I3 | then | I5 | then | I7 | | |
| 18. | I1 | then | (I3 and I4) | then | I5 | then | I7 | | |
| 17. | I1 | then | I3 | then | (I5 and I6) | then | I7 | | |
| 16. | I1 | then | I3 | then | I5 | then | (I7 and I8) | | |
| 25. | (I1 and I2) | then | (I3 and I4) | then | I5 | then | I7 | | |
| 24. | (I1 and I2) | then | I3 | then | (I5 and I6) | then | I7 | | |
| 22. | (I1 and I2) | then | I3 | then | I5 | then | (I7 and I8) | | |
| 23. | I1 | then | (I3 and I4) | then | (I5 and I6) | then | I7 | | |
| 21. | I1 | then | (I3 and I4) | then | I5 | then | (I7 and I8) | | |
| 20. | I1 | then | I3 | then | (I5 and I6) | then | (I7 and I8) | | |
| 29. | (I1 and I2) | then | (I3 and I4) | then | (I5 and I6) | then | I7 | | |
| 28. | (I1 and I2) | then | (I3 and I4) | then | I5 | then | (I7 and I8) | | |
| 27. | (I1 and I2) | then | I3 | then | (I5 and I6) | then | (I7 and I8) | | |
| 26. | I1 | then | (I3 and I4) | then | (I5 and I6) | then | (I7 and I8) | | |
| 30. | (I1 and I2) | then | (I3 and I4) | then | (I5 and I6) | then | (I7 and I8) | | |

FIG. 10

SYSTEM AND METHOD FOR INTRUSION DETECTION

FIELD OF THE INVENTION

This invention relates to intruder and vehicle alarm systems and detectors. In particular, the invention relates to employing a processor and software algorithms comprising an artificial intelligence system with intruder and vehicle alarm systems and detectors to reduce false alarms and detection failures. More particularly, this invention relates to employing artificial intelligence with intruder and vehicle alarm systems and detectors and infrasound detection.

BACKGROUND OF THE INVENTION

Alarm systems balance the requirements of minimizing false alarms against minimizing detection failures. It is desirable to minimize false alarms to reduce the associated nuisance and costs and to minimize detection failures to maintain the deterrent and detection value of the alarm system.

Alarm detection techniques include various switches, motion detectors, glass-break detectors, vibration detectors, infrasound detectors and other techniques. These techniques do not discern the detected activity of an intruder from other detected activities. In fact, the relatively infrequent occurrence of intruder activity results in a high potential for false alarms.

Because present day detectors do not discern intruders from occupants, alarm systems have made the assumption that occupants will modify their behavior to prevent false alarms. The frequent occurrence of false alarms has proven this assumption to be incorrect. Statistics from the public sector and intruder alarm industry indicate that more than 99% of intruder alarm responses may be false and attributed to occupants. This high rate of false alarms is costly to alarm owners, monitoring companies, and police authorities. Such statistics also indicate that alarm systems fail to detect some 30% of intruder occurrences. However, alarm systems are considered to be effective in preventing intrusions attributed to deterrence. Locations with intruder alarm systems exhibit significantly fewer intrusions than locations without alarm systems.

The most effective way to minimize false alarms and detection failures is to include intrinsic intelligence that enables alarm systems and detectors to discern intruders from occupants. Such intrinsic intelligence continuously modifies the response of alarm systems and detectors to detected activities. Artificial intelligence techniques may be employed to provide such intrinsic intelligence. Unlike present day alarm systems that reduce false alarms by minimizing the sources of information, artificial intelligence minimizes false alarms and detection failures by increasing the sources of information thereby improving the decision process. Such information may be provided by a multiplicity of detectors within an alarm system and certain detector technologies.

One such detector technology may be infrasound detection. Infrasound is generally considered to be sub-audible sound with frequencies less than 20 Hz. Infrasound signals inherently contain a large amount of information over a broadband and tend to uniformly fill the environment. Typical causes of infrasound include the movement of large mass objects such as windows and doors and even the flexing of walls, floors and ceilings.

FR 2569027 describes an intruder alarm based on detection of pressure waves in the frequency range below 10 Hz, different frequencies in this range being analyzed and compared, in order to avoid false alarms. An early form of digital signal process (DSP) is used. A series of band-pass filters is defined for separating the signal into various frequency components. Fourier analysis is used to determine various signal parameters. The purpose of the Fourier analysis is to remove undesirable frequencies from the detected signal, and then determine whether the signal is from a singular event (such as a door opening/closing) or an ongoing noise (such as wind). This technique is commonly used in motion detectors.

WO 90/11586 also describes an intruder alarm with detection of pressure waves in a low frequency range, similarly to FR 2569027. However, WO 90/11586 presents an improved frequency filtering system to limit the bandwidth of the detected signal.

The prior art of alarm systems and detectors has mostly tried to improve the ergonomics or the user control interface and reduce spurious alarm responses. As such, present day alarm technologies respond to the presence or absence of a signal without discerning the probable cause of the signal.

In summary, it is generally accepted that alarm systems are effective with the existing rate of detection failures. However, present-day alarm systems and detectors do not discern intruder activities from other activities thereby causing frequent false alarms that reduce the value of the alarm system. It is proposed to employ a processor and software algorithms to comprise an artificial intelligence system for use with intruder and vehicle alarm systems and various detector technologies. Such an artificial intelligence system may discern intruder activities from occupant and other activities thereby reducing false alarms and detection failures. It is also proposed to employ such artificial intelligence system with infrasound detection technology in a manner that may provide comprehensive perimeter detection.

SUMMARY OF THE INVENTION

In accordance with these and other objectives, the present invention is a detection system and method of employing a processor and software algorithms to determine the probable cause of detected signals and thereby reducing false alarms and detection failures. Such a detection system may adapt control parameters in a manner that the alarm responses may be maintained to a predetermined temporal rate. In further accordance with these and other objectives, this invention includes a system and method for receiving signals from conventional detectors and applying such detection system and method. Yet in further accordance with these and other objectives, this invention includes a system and method for receiving infrasound signals and applying such detection system and method. Still in further accordance with these and other objectives, this invention includes a system and method for the detection of infrasound signals in a manner that may be employed by such detection system and method.

More specifically, the present invention is constituted by a system and a method for intrusion detection, precisely stated and defined in the appended independent claims. Preferred and favorable embodiments of the invention appear from the dependent claims attached to the independent claims.

This invention includes a detection system comprised of a processor and software algorithms. The processor receives signals and employs software algorithms to determine information from such signals, further to determine decisions from such information, and accordingly, further to modify decision parameters and criteria. As such, a specific cause of detected signals may be determined from various possible causes, and the determination error decreases with increased quantities of relevant information. The decision parameters may be adaptive to maintain a predetermined temporal rate of alarms for varying detection conditions. The processor and employed software algorithms are such as to constitute an expert system employing artificial intelligence techniques.

An element of this detection system employs the determination of the probability that particular information will occur within an ongoing temporal period. Such information correlates to desired detected activities and may include various signal characteristics, the source detecting the signals, and temporal relationships within and between detected signals.

The typical nature of activities is such that noise occurs frequently, normal activities occur less frequently, and abnormal activities occur least frequently. Therefore it may be inferred that information with a high probability of occurrence may be noise, information with a lower probability of occurrence may be normal activity and information with the least probability of occurrence may be abnormal activity. Threshold limits may be employed to determine inferences of particular activities. Periodically, new threshold limits may be adapted in accordance to varying detection conditions.

However, such inferences may contain error such as a probability that an inference is incorrect. Also, normal activities may occur much more frequently than abnormal activities. As such, erroneously inferred abnormal activities may be significantly more frequent than the actual occurrence of abnormal activities.

Information may also be ordered into logic statements to reduce inference errors. The probability that a particular logic statement may cause an alarm response within an ongoing temporal period may be determined. As such, a set of logic statements may be selected in a manner that the projected temporal rate of alarm responses may be approximately equal to a predetermined temporal rate of alarm responses. A new selection of logic statements may be periodically adapted in accordance to varying detection conditions.

Yet another element of this invention comprises a means of detecting a broad range of analog infrasound signals that may be caused by the movement of a door or window or a structure that encloses a detection space. Such signals are detected in a manner that a digital representation of the signals may be generated and employed by a processor.

An infrasound transducer senses infrasound signals and generates electrical representations of the signals. High and low-pass frequency filters suppress undesirable frequencies in such a manner as to maintain a substantial range of infrasound frequencies. A sequence of amplifiers is arranged such that detected signals may be progressively amplified in such a manner that a contiguous range of signal amplitudes may be determined. Such contiguous range of amplified signals is provided to analog-to-digital converters that generate a digital representation of the signals.

As an example, under such an arrangement a detection system may employ a frequency range of 1 Hz to 15 Hz and an amplitude range of 1000:1. Such a detection system may employ maximum signal amplitude equal to the maximum functional limit of an infrasound detector and a minimum signal equal to 0.1 percent of the maximum signal amplitude.

The preferred embodiment of this invention is a detection system comprising a processor and various software algorithms such as to discern intruder activity from occupant and other activity. The processor may receive analog and digital and binary signals from electronic circuits employed by intruder and vehicle alarm systems and detectors. The software algorithms determine and organize a variety of information from the received signals and relative to temporal periods within and between such signals. The software algorithms then employ ongoing statistical methods to determine the probability of occurrence of particular information relative to currently and previously detected information. The probable cause of the information is then inferred from the determined probability of occurrence. Inferred information is then organized into various logic statements and an alarm response is generated when a logic statement is fulfilled.

Furthermore and relative to this preferred embodiment, probability thresholds and various logic statements may be employed as control parameters in the determination of alarm responses. Such control parameters may be predetermined or adaptive. Predetermined parameters are fixed and do not change with the rate of detected activity. Adaptive parameters are variable and may change with the rate of detected activity. Such adaptive parameters may be employed to maintain alarm responses at a predetermined temporal rate. In addition, control signals may be employed to indicate temporal periods during which the detection process is to be active, and to remove information that may not be relevant to the detection process.

A second embodiment of this invention is an alarm system composed of a multiplicity of detectors. One or more detectors may provide signals and temporal information to a detection system as described in the preferred embodiment of this invention.

A third embodiment of this invention is an infrasound detector as may be employed in an alarm system. An electronic circuit detects and provides a broad range of amplitudes and frequencies and temporal information to a detection system as described in the preferred embodiment of this invention.

Other embodiments of this invention include various detector technologies such as switches, particularly magnetic switches, vibration detectors, motion detectors and glass-break detectors that may employ a detection system as in the preferred embodiment of this invention.

Yet other embodiments of this invention include various alarm systems and detector technologies that may be combined and may employ a detection system as in the preferred embodiment of this invention.

BRIEF DESCRIPTION OF THE DRAWINGS

FIG. 4 is a table of various detector information as may be employed in the second embodiment of the detection system.

FIG. 5 is a table of various detector logic statements that employ the detector information of FIG. 4 and as may be employed in the second embodiment of the detection system.

FIG. 9 is a table of various infrasound information as may be employed in the third embodiment of the detection system.

FIG. 10 is a table of various infrasound logic statements that employ the infrasound information of FIG. 9 and as may be employed in the third embodiment of the detection system.

DESCRIPTION OF PREFERRED EMBODIMENTS

Figure 1:
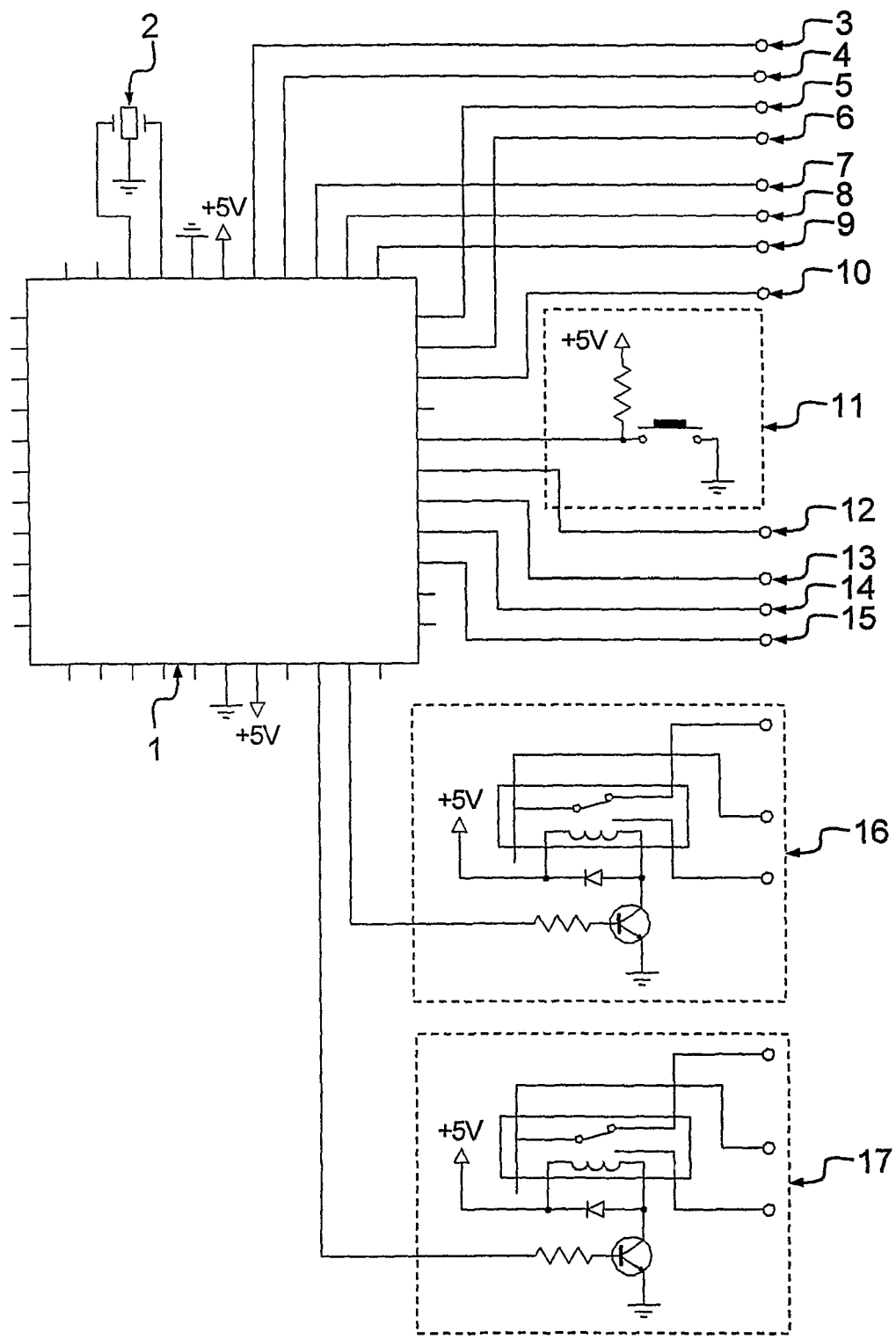
FIG. 1 is a schematic diagram of a processor circuit capable of receiving binary, digital, and analog signals as may be employed in the preferred embodiment of the detection system.

FIG. 1 is a schematic diagram of a processor for intruder and vehicle alarm systems and detectors as in the preferred embodiment of this invention. The invention consists of a processor 1 that has sufficient internal non-volatile and volatile memory to retain and employ the desired software algorithms. A precision oscillator 2 is selected with such a frequency that the ports of processor 1 are sampled with sufficient precision and the software algorithms are employed at a desired rate. The oscillator 2 may be selected at lower frequencies for battery operation and less precision.

The processor 1 has multiple ports to receive and transmit information. Ports 3 and 4 and 5 and 6 include analog-to-digital converters and may receive analog signals such as from an infrasound signal detection circuit. Ports 7 and 8 and 9 may receive and transmit digital signals such as to communicate with various related devices. Port 10 is employed to inform processor 1 when the detection process is to be active and received information is to be processed. Port 11 is employed to reset the processor to a set of predetermined conditions. Port 12 is employed to delete certain signal information that may have been previously received. Ports 13 and 14 and 15 may receive binary information, such as the output of relay switches employed by detectors. Certain ports may be reconfigured to receive the various types of information.

The processor 1 controls relay switches 16 and 17 that change state to generate an alarm response. These relay switches are controlled independently such that relay switch 16 responds to signals from ports 3 and 4 and 5 and 6 and relay switch 17 responds to signals from ports 13 and 14 and 15. The digital signals from ports 7 and 8 and 9 may be assigned as independent or associated with relay switches 16 or 17.

The processor 1 is operative to draw conclusions determined to be probable from information that has been retained and recalled in memory on an ongoing basis and towards one or more predetermined goals, as such comprising an artificial intelligence system.

Figure 2:
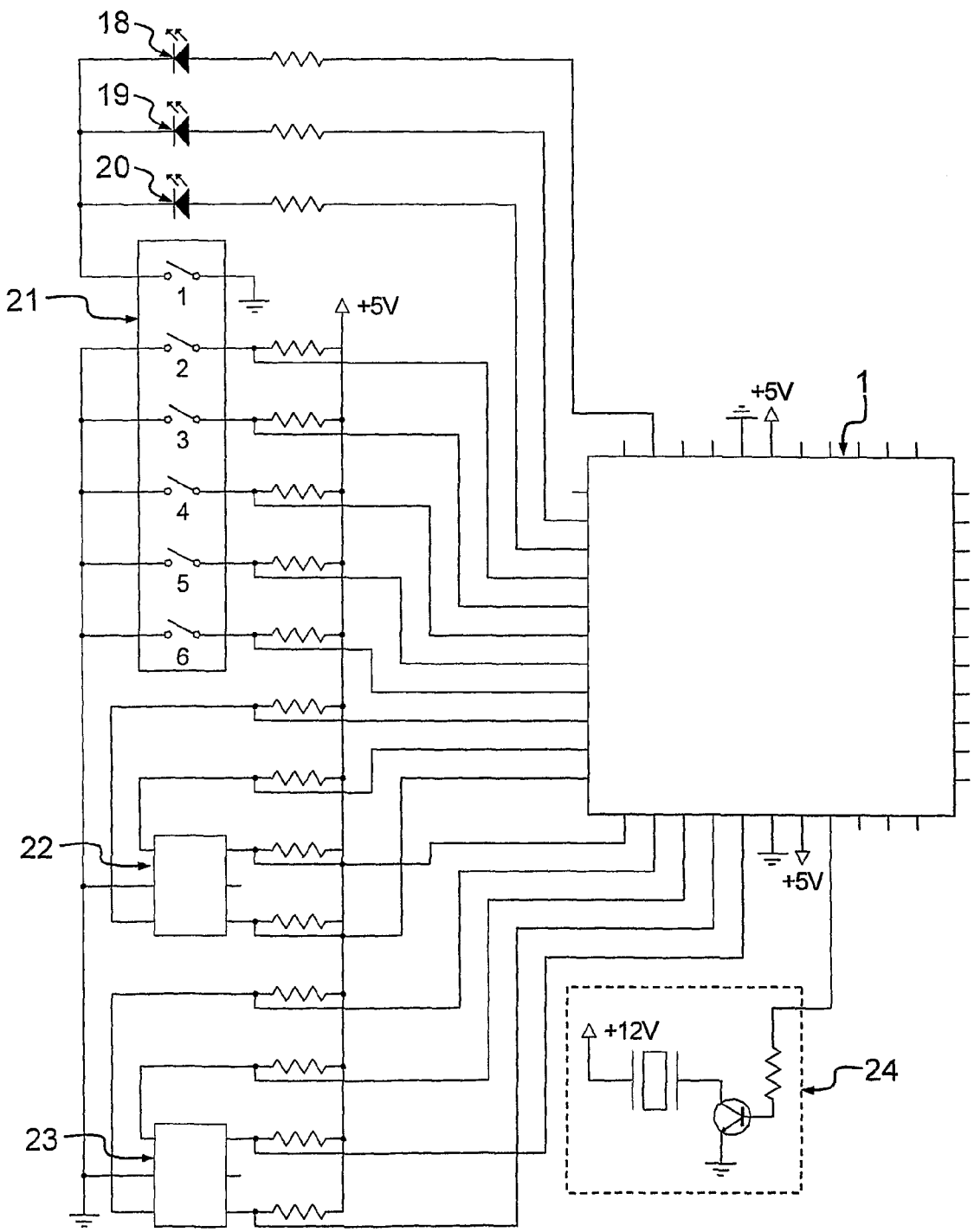
FIG. 2 is a schematic diagram of the various controls, indicators and audio alert as may be employed in the preferred embodiment of the detection system.

FIG. 2 is also a schematic diagram of a processor for intruder and vehicle alarm systems and detectors as in the preferred embodiment of this invention. Processor 1 controls LED visual indicators 18 and 19 and 20. Indicator 18 lights when receiving certain signals associated with relay switch 16. Indicator 19 lights during predetermined sampling periods. Indicator 20 lights when receiving certain signals associated with relay switch 17.

Switch 21 provides instructions to the processor 1 and controls the various LED indicators 18 and 19 and 20. Switch 21 is composed of six independent DIP switches. Switch 1 of switch 21 enables and disables the LED indicators 18 and 19 and 20. Switch 2 of switch 21 instructs the frequency mode employed during the detection of infrasound. Frequency mode determines whether the infrasound frequency thresholds are either at fixed values or adaptive to detected activities. Switch 3 of switch 21 instructs the alarm mode for relay switch 16. Switch 4 of switch 21 instructs the alarm mode for relay switch 17. Switch 5 of switch 21 activates the test mode for relay switch 16. Switch 6 of switch 21 activates the test mode for relay switch 17. During test mode, respectively, the detection process defaults to predetermined control parameters and an audible alert 24 sounds a tone when an alarm response is generated.

Switches 22 and 23 are ten position binary coded decimal rotary switches that provide instructions to the software algorithms regarding detection control parameters. Switch 22 instructs the detection control parameters for relay switch 16 and switch 23 instructs the detection control parameters for relay switch 17. The various positions of switches 22 and 23 are labeled 0 thru 9.

When switch 22 is set to position 0 the software algorithms relating to relay switch 16 are disabled. When switch 3 of switch 21 is set to temporal alarm mode, positions 1 thru 9 of switch 22 instruct various predetermined temporal rates of alarm responses for relay switch 16. When switch 3 of switch 21 is set to fixed alarm mode, positions 1 thru 9 of switch 22 instruct various thresholds and logic statements to be employed in the determination of alarm responses for relay switch 16.

When switch 23 is set to position 0 the software algorithms relating to relay switch 17 are disabled. When switch 4 of switch 21 is set to temporal alarm mode, positions 1 thru 9 of switch 23 instruct various predetermined temporal rates of alarm responses for relay switch 17. When switch 4 of switch 21 is set to fixed alarm mode, positions 1 thru 9 of switch 23 instruct various thresholds and logic statements to be employed in the determination of alarm responses for relay switch 17.

Figure 3:
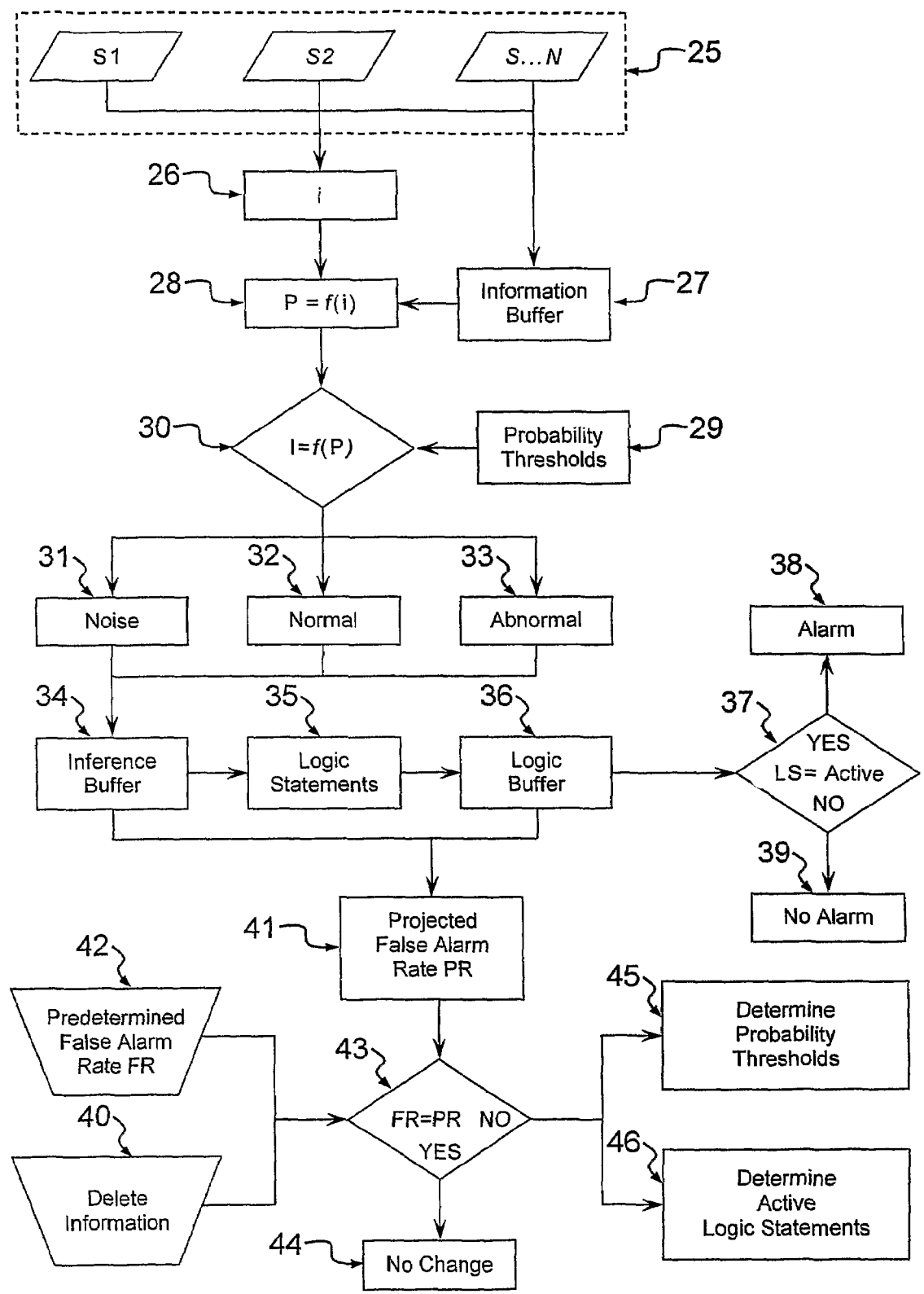
FIG. 3 is a flow chart indicating the software algorithm processes as may be employed in the preferred embodiment of the detection system.

FIG. 3 is a flow chart diagram of the software algorithms employed to determine alarm responses as in the preferred embodiment of this invention. The processor receives detection signals 25. Information 26 such as the source that detected the signal, the detection characteristic of the signal and temporal relationship between signals is determined. Certain currently and previously detected information is retained in a sequential buffer 27 and the probability of occurrence 28 is statistically determined for such information. The probability of occurrence is compared to probability thresholds 29 and inferences 30 are made regarding particular information such that information with high probability of occurrence is inferred to be noise 31, information with a lower probability of occurrence is inferred to be caused by normal activity 32, and information with the least probability of occurrence is inferred to be caused by abnormal activity 33. Such inferred information is retained in a sequential buffer 34.

Inferred information is then organized into various logic statements 35 to further determine the probability of occurrence of the information. The fulfillment of logic statements is retained in a sequential buffer 36 then it is determined if a logic statement is active 37. A logic statement is considered fulfilled when the conditions of the logic statement are met with current information. In the event that a fulfilled logic statement is active an alarm response is generated 38 or in the event that the fulfilled logic statement is inactive no alarm response is generated 39. In the event that information is invalid the sequential buffers may be instructed to delete the information 40.

In the event of temporal alarm mode, current and previous inferences and fulfilled logic statements are employed to statistically determine the projected alarm rate 41. A desired alarm rate is instructed 42. The projected alarm rate is compared to the instructed alarm rate 43. If the projected alarm rate is approximately equal to the predetermined alarm rate no change is made to the probability thresholds 29 or the logic statements that are determined to be active. If the projected false alarm rate is not approximately equal to the predetermined alarm rate the control parameters adapt by determining new probability thresholds 45 and new active logic statements 46.

In the event of fixed alarm mode various sets of one or more logic statements 35 may be predetermined. Alarm responses may then determined by the set of logic statements that are instructed to be active. As such probability thresholds may be determined 45 upon the statistical analysis of the inferred information 34.

FIG. 4 is a table of the information employed in a system of three detectors as in the second embodiment of this invention. Such detectors may be magnetic switches or motion detectors or other types of detectors. The signal is a binary presence or absence of a voltage that alters state as a particular detector responds with a detection response. The detection process begins when any one detector generates a detection response. The temporal information is the difference between a previous detector response and the current detector response within relevant time frames. Such signals and information may be employed by the preferred embodiment of this invention.

FIG. 5 is a table of the logic statements employed in a system of three detectors as in the second embodiment of this invention. The table contains the combinations and permutations of the various combinations for the information of FIG. 4. All or a portion of the logic statements may be active during the detection process. An alarm response is generated when any active logic statement is fulfilled. Such logic statements may be employed by the preferred embodiment of this invention.

Figure 6:
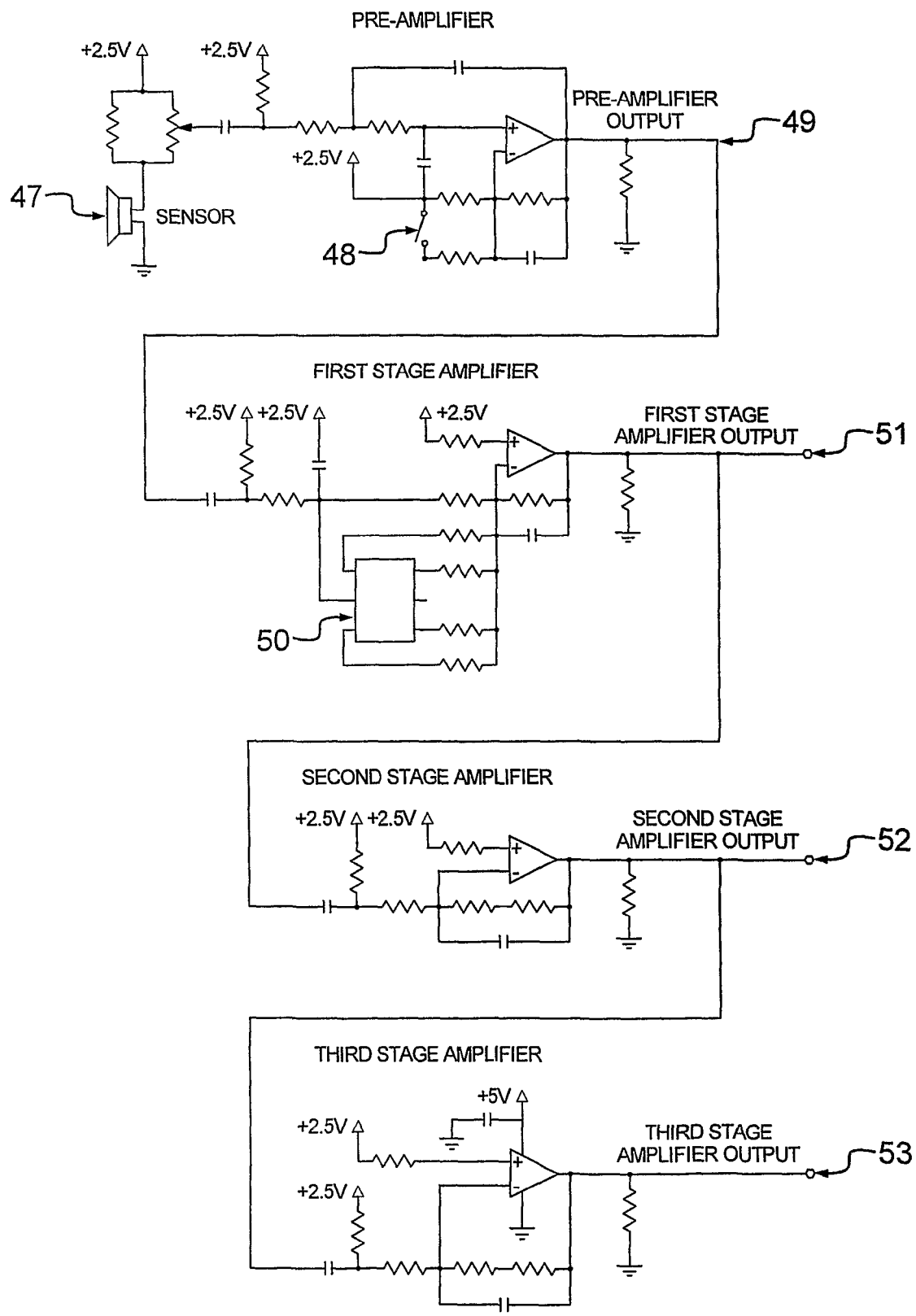
FIG. 6 is a schematic diagram of an improved means of detecting infrasound signals as may be employed in the third embodiment of the detection system.

FIG. 6 is a schematic circuit diagram for improved infrasound detection as in the third embodiment of this invention. A +5 volt power source and a +2.5 volt DC Offset power source are supplied to the circuit in such a manner that positive and negative signal amplitudes may be detected. The +2.5 volt power source is also supplied to port 3 of processor 1 to establish a reference when determining signal amplitudes and frequencies. An infrasound sensor 47 senses ambient infrasound signals and generates an analog electrical representation of the signal. The signal from the sensor is then supplied to a preamplifier circuit that has high pass and low pass frequency filter characteristics to suppress undesirable frequencies. The preamplifier has a gain control switch 48 for large gain adjustments. The output of the preamplifier is supplied to a first stage amplifier circuit that further amplifies the signal and has high pass and low pass filtering characteristics to further suppress undesirable frequencies. The first stage amplifier circuit has a ten position binary coded decimal rotary switch 50 for small gain adjustments. The output of the first stage amplifier 51 is supplied to port 4 of processor 1 and to the second stage amplifier circuit. The second stage amplifier circuit yet further amplifies the signal and has low pass filtering characteristics to further suppress undesirable frequencies. The output of the second stage amplifier 52 is supplied to port 5 of processor 1 and to the third stage amplifier circuit. The third stage amplifier circuit yet further amplifies the signal and has low pass filtering characteristics to further suppress undesirable frequencies. The output of the third stage amplifier 53 is supplied to port 6 of processor 1 and to the third stage amplifier circuit. The gain of the amplifiers is such that the processor 1 may determine a broad range of signal amplitudes in a contiguous manner. Such an infrasound detection circuit may be employed by the preferred embodiment of this invention.

Figure 7:
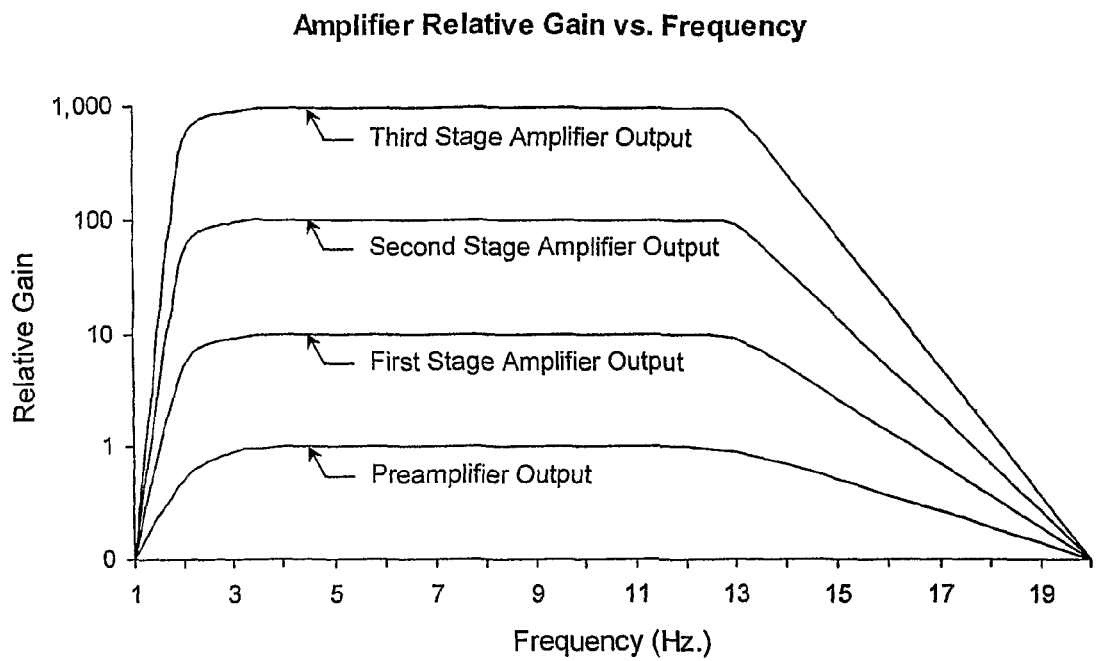
FIG. 7 is a chart of the frequency vs. gain response for the amplifiers of the infrasound detection schematic diagram of FIG. 6.

FIG. 7 is a diagram of the frequency response for the various amplifiers of FIG. 6.

Figure 8:
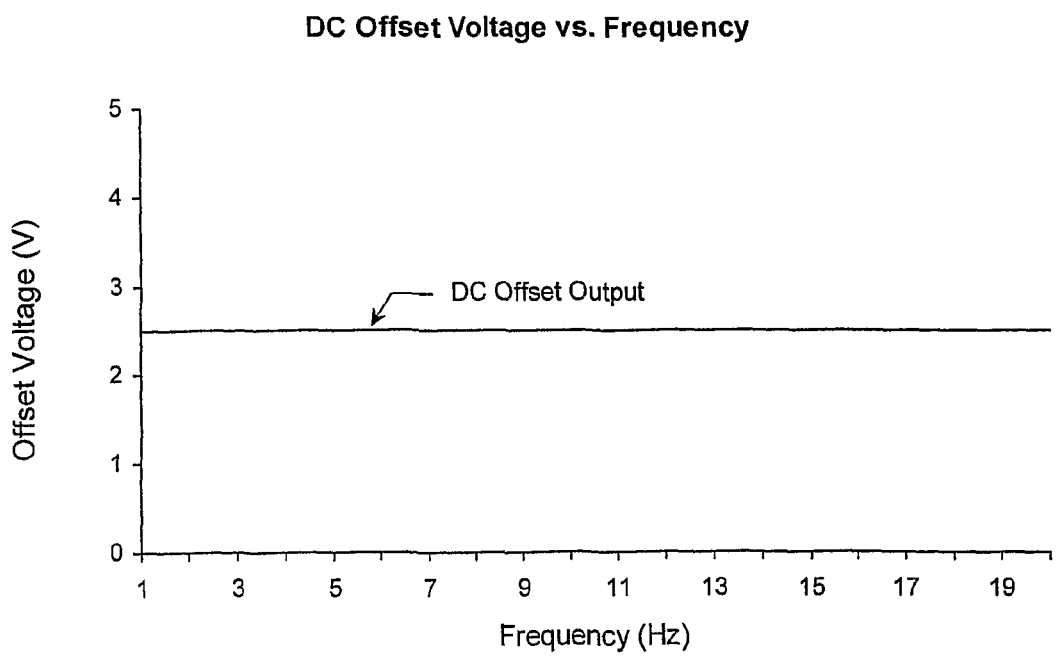
FIG. 8 is a chart of the frequency vs. gain response for the DC offset voltage of the infrasound detection schematic diagram of FIG. 6.

FIG. 8 is a diagram of the frequency response for the +2.5 volt DC Offset power source of FIG. 6.

FIG. 9 is a table of the information employed in the detection of four distinct and sequential infrasound signals as in the third embodiment of this invention. The statistical parameters of signal amplitudes and frequencies are determined on an ongoing basis and probability thresholds are determined in such a manner that noise, normal activity and abnormal activity may be inferred. Statistical parameters are also determined for temporal relationships to identify signals of a compound nature. Such a compound signal may be composed of subsignals of various amplitudes and frequencies. The detection process begins when an initial signal is detected. Other temporal information is the difference between a previous signal and a current signal within relevant time frames. Such signals and information may be employed by the preferred embodiment of this invention.

FIG. 10 is a table of the logic statements employed in the detection of four infrasound signals as in the third embodiment of this invention. The table contains the combinations and permutations of the various combinations for the information of FIG. 9. All or a portion of the logic statements may be active during the detection process. An alarm response is generated when the any active logic statement is fulfilled. Such logic statements may be employed by the preferred embodiment of this invention and such an alarm response may be employed as information for FIG. 4 as in the second embodiment of this invention.

The invention claimed is:

1. Intrusion detection system comprising at least one intrusion detector and a processor connected thereto, wherein the processor is operative to adaptively optimize threshold levels of probability of occurrence of pre-defined signal states from said at least one intrusion detector, to a predetermined temporal rate of false alarms, wherein said processor is governed by specific software algorithms and constitutes an intrinsic artificial intelligence system for determining the probable cause of signal states delivered by said at least one detector, and wherein said processor is operative to calculate probabilities of occurrence on the basis of previously received signals from said at least one detector.

2. The intrusion detection system of claim 1, wherein said processor is operative to optimize threshold levels at least between a noise signal range, a normal activity signal range and an intrusion signal range.

3. The intrusion detection system of claim 1, characterized in that said processor is operative to determine and organize information resulting from signals received from said at least one detector, as well as information about temporal periods within and between such signals.

4. The intrusion detection system of claim 3, characterized in that said processor is operative to employ statistical methods to determine probability of occurrence of singular information and sets of plural information temporally relative to previous information resulting from signals from said at least one detector.

5. The intrusion detection system of claim 4, characterized in that said singular information consists of signal characteristics, while said plural information consists of temporal relationships within and between signals, characteristics of said at least one detector, as well as signal characteristics.

6. The intrusion detection system of claim 1, characterized in that said pre-defined signal states comprise any of at least noise states, normal activity states and abnormal states.

7. The intrusion alarm detection system of claim 6, characterized in that a noise state, normal activity state and abnormal state, respectively, are signal states corresponding to low or no activity, normally occurring activity and unusual activity, respectively, by persons, animals, machines or environment in an intrusion detector detection area.

8. The intrusion detection system of claim 1, characterized in that said at least one intrusion detector comprises at least one infrasound transducer.

9. The intrusion detection system of claim 8, characterized in that said at least one infrasound transducer is connected to said processor via at least high- and low-pass filters in order to suppress undesirable frequencies.

10. The intrusion detection system of claim 8, characterized in that said at least one infrasound transducer is connected to a sequence of amplifiers with respective outputs, so as to provide a contiguous range of signal amplitudes for presentation to A/D converters that generates a digital signal representation for further processing.

11. The intrusion detection system of claim 1, characterized in that said at least one intrusion detector comprises at least one among switches, motion detectors, glass-break detectors and vibration detectors.

12. A method for intrusion detection, said method comprising using at least one intrusion detector and a processor connected thereto, wherein said processor adaptively optimizes threshold levels of probability of occurrence of pre-defined signal states from said at least one intrusion detector, to a predetermined temporal rate of false alarms, wherein specific software algorithms govern said processor to determine the probable cause of signal states delivered by said at least one detector, the combination of said processor and said algorithms thereby constituting an intrinsic artificial intelligence system, and wherein said processor calculates probabilities of occurrence on the basis of previously received signals from said at least one detector.

13. The method of claim 12, characterized in that said processor optimizes threshold levels at least between a noise signal range, a normal activity signal range and an intrusion signal range.

14. The method of claim 12, characterized in that said processor determines and organizes information resulting from signals received from said at least one detection device, as well as information about temporal periods within and between such signals.

15. The method of claim 14, characterized in that said processor employs statistical methods, to determine probability of occurrence of singular information and sets of plural information temporally relative to previous information resulting from signals from said at least one detection device.

16. The method of claim 15, wherein said singular information consists of signal characteristics, while said plural information consists of temporal relationships within and between signals, characteristics of said at least one detector, as well as signal characteristics.

17. The method of claim 12, characterized in that said at least one intrusion detector gives off signals belonging to any of the pre-defined signal states: noise states, normal activity states and abnormal states.

18. The method of claim 17, characterized in that low or no activity, normally occurring activity, and unusual activity, respectively, exercised by persons, animals, machines or environment in an intrusion detector detection area result in the respective intrusion detector signal states; noise state, normal activity state and abnormal state.

19. The method of claim 12, characterized in that at least one infrasound transducer operates as said at least one intrusion detector.

20. The method of claim 19, characterized in that said at least one infrasound transducer delivers signals representing infrasound to said processor via at least high- and low-pass filters for suppressing undesirable frequencies.

21. The method of claim 19, characterized in that a sequence of amplifiers connected to receive and amplify signals from said at least one infrasound transducer and having respective outputs, provide a contiguous range of signal amplitudes for presentation to A/D converters that generate a digital signal representation for further processing.

22. The method of claim 12, characterized in that at least one among switches, motion detectors, glass-break detectors and vibration detectors operates as said at least one intrusion detector.

23. An intrusion detection system comprising at least one intrusion detector and a processor connected thereto, wherein the processor comprises the following means:
  (a) means for receiving a detection signal or signals from the at least one intrusion detector,
  (b) means for organizing information from the received signal or signals temporally,
  (c) means for storing the organized information,
  (d) means for determining based on the stored information a probability that the received signal or signals occurred as a result of intrusive activity, for comparing the probability of occurrence with a probability threshold level and for generating inferred information as to a probable cause of the received signal or signals from the comparing,
  (e) means for determining whether the inferred information as to probable cause fulfils an active logic statement and, if so, for generating an alarm response,
  (f) means for storing inferred information,
  (g) means for storing fulfilled logic statements,
  (h) means for determining a projected alarm rate from the stored inferred information and the stored fulfilled logic statements, and
  (i) means for comparing the projected alarm rate with a predetermined alarm rate, and for changing the probability threshold level if the projected and predetermined alarm rates are not equal.

24. The intrusion detection system according to claim 23, wherein the means (d) generates inferred information by categorizing the stored information into a plurality of predefined states selected from the group consisting of noise, normal activity and abnormal activity and infers that the predefined state with the least probability of occurrence constitutes intrusive activity.

* * * * *